United States Patent [19]
Ohel

[11] Patent Number: 6,075,794
[45] Date of Patent: Jun. 13, 2000

[54] METHOD FOR COORDINATING INBOUND CHANNELS IN A SELECTIVE CALL COMMUNICATION SYSTEM

[75] Inventor: Hagai Ohel, Coconut Creek, Fla.

[73] Assignee: Motorola, Inc., Schaumburg, Ill.

[21] Appl. No.: 09/097,764

[22] Filed: Jun. 16, 1998

[51] Int. Cl.$^7$ .......................... H04B 7/212; H04L 12/42; H04L 12/403; G05B 23/02
[52] U.S. Cl. .......................... 370/443; 370/449; 370/468; 370/348; 370/322; 340/825.08
[58] Field of Search ................... 370/322, 337, 370/345, 346, 347, 348, 395, 442, 443, 449, 461, 465, 468; 340/825.08

[56] References Cited

U.S. PATENT DOCUMENTS

| | | | |
|---|---|---|---|
| 5,081,623 | 1/1992 | Ainscow | 370/451 |
| 5,166,929 | 11/1992 | Lo | 370/85.3 |
| 5,181,200 | 1/1993 | Harrison | 370/85.1 |
| 5,311,516 | 5/1994 | Kuznicki et al. | 370/94.1 |
| 5,371,899 | 12/1994 | Kuznicki et al. | 455/34.1 |
| 5,422,733 | 6/1995 | Merchant et al. | 358/407 |
| 5,521,926 | 5/1996 | Ayerst et al. | 370/953 |
| 5,619,492 | 4/1997 | Press et al. | 370/441 |
| 5,638,369 | 6/1997 | Ayerst et al. | 370/346 |
| 5,854,994 | 12/1998 | Canada et al. | 370/498 |

*Primary Examiner*—Michael Horabik
*Assistant Examiner*—Kevin C. Harper
*Attorney, Agent, or Firm*—Keith A. Chanroo

[57] ABSTRACT

A method for coordinating an inbound channel in a selective call communication system (100) includes the steps of encoding (702) an expected time for an inbound response and a number of bits in the inbound response with an outbound message requesting information from a selective call device; transmitting (704) the outbound message to the selective call device; allocating (706) an inbound channel; determining (708) the number of bits to be encoded in at least one time slot of the inbound channel; transmitting (710) the inbound channel, the number of bits to be transmitted in the at least one time slot to the selective call device; encoding (712) the information being requested on the inbound channel with the number of bits in the at least one time slot; and transmitting (714) the inbound response on the inbound channel with the number of bits specified for each of the at least one time slot.

12 Claims, 6 Drawing Sheets

METHOD FOR COORDINATING INBOUND CHANNELS IN A SELECTIVE CALL COMMUNICATION SYSTEM

FIELD OF THE INVENTION

This invention relates in general to selective call communication systems and in particular to a method for coordinating inbound responses to a selective call communication system from a selective call device.

BACKGROUND OF THE INVENTION

Known techniques of transmitting and receiving inbound messages in a multichannel communication system from a plurality of selective call devices on a plurality of inbound channels include such techniques as a scheduled inbound transmission protocol and techniques which use a contention (unscheduled) inbound transmission protocol. An example of a scheduled transmission protocol is a transmission protocol in which at least one predetermined time slot is reserved on at least one predetermined inbound channel for each selective call device which is active in the selective call communication system. Another example of a scheduled inbound transmission protocol is a transmission protocol in which a selective call device is notified of a demand response time slot to be used for transmitting a long inbound message. The notification is given within an outbound message which is sent in response to a short inbound message sent by the selective call device informing the communication system of the existence of the long inbound message.

An example of a contention inbound transmission protocol is an ALOHA protocol, which is well known to one of ordinary skill in the art. Inbound messages sent by an ALOHA protocol are typically transmitted as soon as they are generated. When two such messages happen to be transmitted on one channel such that some portions are transmitted simultaneously, one or both messages may not be received correctly. In this event, the messages are not acknowledged by the selective call communication system and each selective call device repeats the message after a random delay.

The communication system may be a wireline or optical or radio communication system. In a wireline system, the inbound channels may be separated by physically different wires, or may be separated (particularly in the case of high speed wireline systems) by band limited channels, or by both. In optical or radio communication systems, the channels are typically separated by band-limited channels, but may alternatively or additionally be separated by time or code division duplexing.

Some systems which have an outbound signaling protocol which is synchronous are designed so that the selective call devices acquire synchronization to the outbound signaling protocol and use a scheduled inbound transmission protocol, because a scheduled inbound transmission protocol is typically more efficient than a contention inbound transmission protocol for several types of inbound messages, such as some demand responses and acknowledgments. However, a contention transmission protocol can typically be more efficient for other types of inbound messages, such as some unsolicited inbound messages. Thus it can be desirable to provide for both types of inbound transmission protocols.

Prior art systems typically provide for a mix of scheduled and contention inbound transmission protocols by designating some types of messages to be transmitted using an ALOHA protocol and other types of messages to be transmitted using a scheduled transmission protocol. A selective call device then uses the indicated technique on an authorized inbound channel. The authorized inbound channel is typically any one of the inbound channels which the selective call device is designed to use.

In the prior art systems, the selective call device must seek permission and wait an unspecified length of time before it can be granted a channel to send its in response. This method involves several transmissions and retransmissions between the selective call device, the radio frequency controller, and a home terminal before approval can be communicated to the selective call device.

Thus, what is needed is a technique for reducing the number of transmissions and the latency time currently being experienced when a selective call device requests permission to transmit a response to a received message.

DETAILED DESCRIPTION OF THE INVENTION

Figure 1:
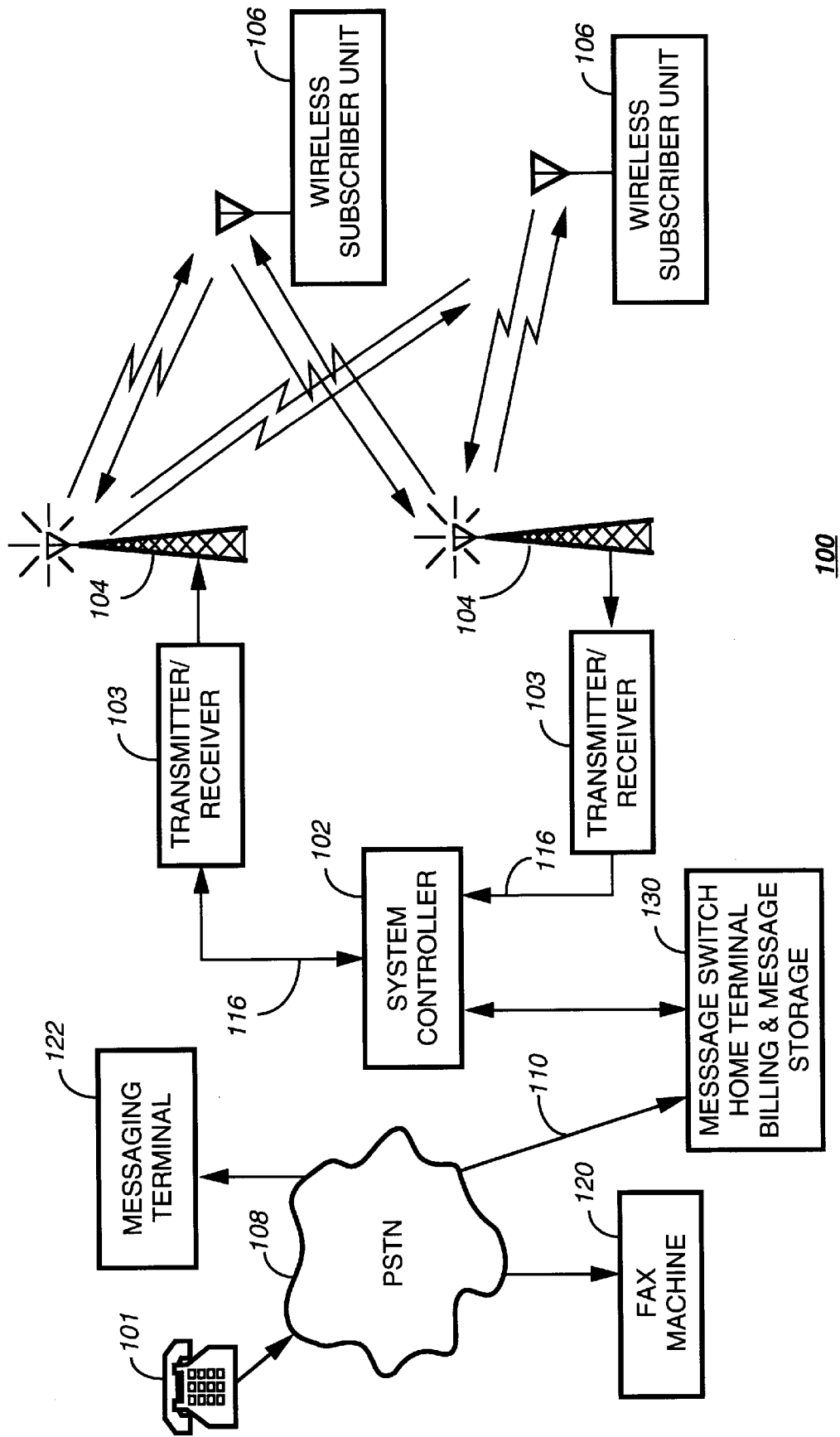
FIG. 1 is an electrical block diagram of a selective call communication system in accordance with the preferred embodiment of the present invention.

Referring to FIG. 1, an electrical block diagram of a selective call or radio communication system 100 is shown in accordance with the preferred embodiment of the present invention. The selective call communication system 100 comprises a message input device, such as a conventional telephone 101, a facsimile machine 120 or a messaging terminal 122, connected through a conventional public switched telephone network (PSTN) 108 by conventional telephone links 110 to a message switch home terminal, 130 which is coupled to a system controller 102. The system controller 102 oversees the operation of a plurality of radio frequency (RF) transmitter/receivers 103, through one or more communication links 116, which typically are twisted pair telephone wires, and additionally can include RF, microwave, or other high quality audio communication links. The system controller 102 encodes and decodes inbound and outbound telephone addresses into formats that are compatible with land-line message switch computers. The system controller 102 also functions to encode and schedule outbound messages, which can include such information as analog voice messages, digital alphanumeric messages, and response commands, for transmission by the radio frequency (RF) transmitter/receivers 103 to a plurality of selective call devices 106. As shown, the selective call devices 106 are preferably two-way communication devices including message transmission or response generally referred as acknowledge-back (ACKBACK). The system controller 102 further functions to decode inbound messages, including unsolicited and response messages received by the radio frequency transmitter/receivers 103 from the plurality of selective call devices 106. According to the preferred embodiment, these selective call devices 106 are special purpose devices, e.g., meter reading, fire, status, security devices, etc. which are positioned at special location to communicate status or values to the system controller and the home terminal when requested. These special purpose selective call devices 106, upon the receipt of an outbound message, measures, reads or acquires at least one predetermined parameter and returns the measured, acquired or read value to the system controller.

An example of an outbound alphanumeric message intended for a selective call device 106 is an alphanumeric page message entered from the messaging terminal 122. An example of an outbound analog message intended for a selective call device 106 is a voice page message entered from the telephone 101. Examples of response messages are acknowledgments and demand response messages. An acknowledgment is an inbound message transmitted by a selective call device 106 which indicates successful reception of an outbound message and according to the preferred embodiment, returns information to the system controller 102. A demand response message is a message sent from a selective call device 106 in response to a command included in an outbound message from the system controller 102. An example of a demand response message is a text message initiated by the selective call device 106, but which is not transmitted until after a demand response command is received from the system controller 102. The demand response command, in turn, was sent by the system controller 102 after an inbound message requesting permission to transmit the demand response message was communicated from the selective call device 106 to the system controller 102. A response message is transmitted by a selective call device 106 at a time scheduled by the system controller 102 and designated within an outbound demand message, or the demand response message is transmitted using an unscheduled technique which is a slotted ALOHA protocol, well known to one of ordinary skill in the art. When the demand response is transmitted using an ALOHA protocol, it is called a demand ALOHA response message. An unsolicited message is an inbound message transmitted by a selective call device 106 without having received an outbound message which requires a response. An example of an unsolicited message is an inbound message from a selective call device 106 which alerts the device communication system 100 that the selective call device 106 is within radio range of the radio communication system 100. An unsolicited message can include a request to transmit a scheduled or demand response which can include data such as alphanumeric data. Unsolicited messages are transmitted using the slotted ALOHA protocol. The inbound and outbound messages are included in outbound radio signals transmitted from, and inbound radio signals received by, a conventional antenna 104 coupled to the radio frequency transmitter/receiver 103.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network. Moreover, as one of ordinary skill in the art would recognize, the telephonic and selective call device communication system functions can reside in separate system controllers 102 which operate either independently or in a network fashion.

Each of the selective call devices 106 assigned for use in the radio communication system 100 has at least one address assigned thereto which is a unique selective call address. The selective call address enables the transmission of a message from the system controller 102 only to the addressed selective call device 106.

Figure 2:
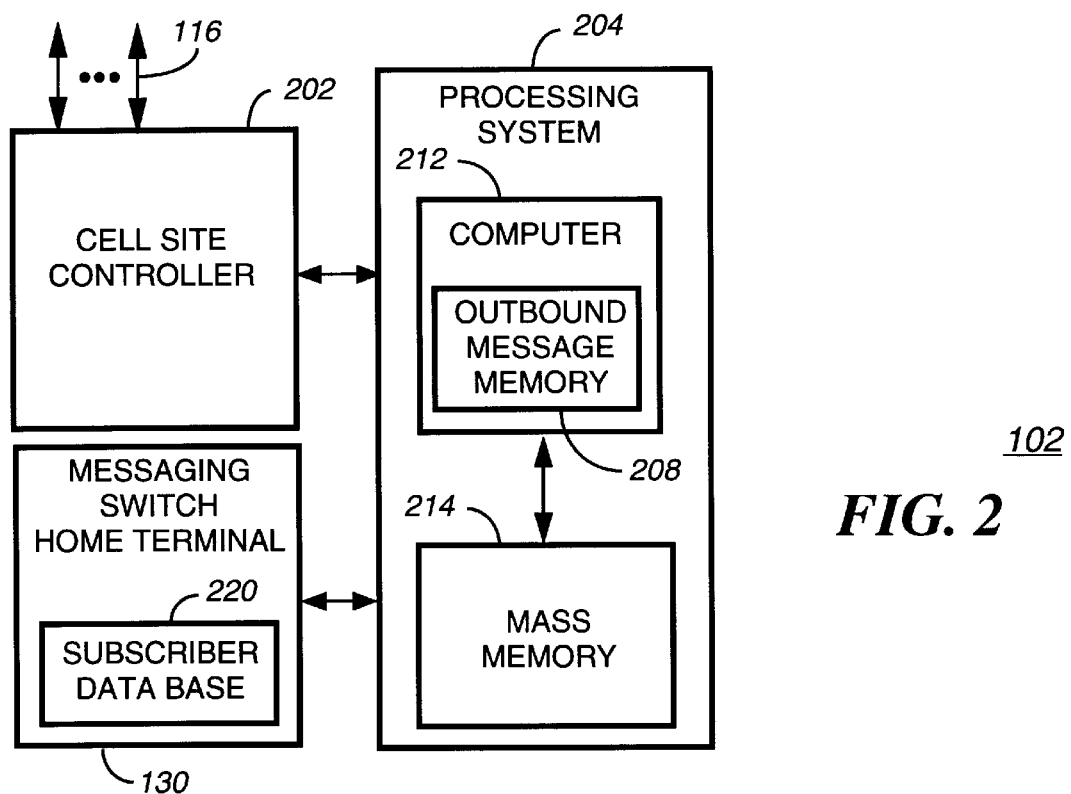
FIG. 2 is an electrical block diagram of the system controller according to FIG. 1.

It will be appreciated that the selective call device 106 is one of several types of radios, including two-way pagers, conventional mobile radios, conventional or trunked mobile radios which have a data terminal attached thereto, or which optionally have data terminal capability designed in. Each of the selective call devices 106 assigned for use in the radio communication system 100 has an address assigned thereto which is a unique selective call address. The address enables the transmission of a message from the system controller 102 only to the addressed selective call device, and identifies messages and responses received at the system controller 102 from the selective call device 106. Furthermore, each of one or more of the selective call devices 106 can have a unique telephone number assigned thereto, the telephone number being unique within the PSTN 108. A list of the assigned selective call addresses and correlated telephone numbers for the selective call devices is stored preferably in the home terminal 130 in the form of a subscriber data base 220 (FIG. 2). The messaging switch home terminal 130 is coupled to the system controller 102. The subscriber data base 220 stores all the financial and billing information relating to the plurality of selective call devices 106 that subscribe to the selective call communication system 100. When the system controller 102 receives an inbound message from a selective call devices, the system controller 102 establishes communication with the home terminal 130 to ensure that the requesting selective call device 106 is a valid subscribing unit within the communication system 100. The home terminal 130 also stores messages until the messages are delivered.

Referring to FIG. 2, an electrical block diagram of the system controller 102 is shown in accordance with the preferred embodiment of the present invention. The system controller 102 queues data and stored voice messages for transmission to the selective call devices 106, connects telephone calls for transmission to the selective call devices 106, and receives acknowledgments, demand responses, unsolicited data and stored audio messages, and telephone calls.

The system controller 102 comprises a cell site controller 202, a processing system 204, and an outbound message memory 208. The cell site controller 202 is coupled to the radio frequency transmitter/receivers 103 (FIG. 1) by the links 116. The cell site controller 202 transmits outbound messages which include selective call addresses to the transmitter/receivers 103 and controls the transmitter/receivers 103 to transmit radio transmission cycles which include the outbound messages, using one or more outbound channels as scheduled by a message handler function. The cell site controller 202 also processes inbound messages from the selective call devices 106. The inbound messages are received by the transmitter/receivers 103 on a set of inbound radio channels, and are coupled to the cell site controller 202. The processing system 204, which includes the message handler function for routing and processing messages, is coupled to the cell site controller 202, the subscriber data base 220, and the outbound message memory 208.

The messaging switch home terminal 130 is coupled to the processing system which coordinates inbound responses from the selective call device. The home terminal 130 preferably includes the subscriber data base 220, which is coupled to the processing system 204, stores information for each subscriber, including a correlation between a selective call address assigned to each selective call device 106 and the telephone number used within the PSTN 108 to route messages and telephone calls to each selective call device 106, as well as other subscriber determined preferences, such as hours during which messages are to be held back from delivery to the selective call device 106. The outbound message memory 208 of the processing system 204 is for storing a queue of messages which are queued for delivery to at least one of the plurality of selective call devices 106, wherein each message of the queue of messages is associated with a selective call address, also stored in the outbound message memory 208 of one of the plurality of selective call devices 106 for which each message is intended.

Analog messages are converted to digital form by the processing system 204, prior to being stored in the outbound message memory 208. The message handler function schedules outbound messages and the selective call addresses associated therewith for transmission within a transmission cycle, by scheduling, as necessary, portions of messages within frames of a transmission cycle. As described above, messages may have either digital information, such as a alphanumeric message, or analog information, such as voice. A digital portion of a cycle which, in accordance with the preferred embodiment of the present invention is one or more control frames, is prepared for transmission by the message handler function, which determines from the subscriber data base 220 in the home terminal 130 the selective call addresses of selective call devices associated with both numeric and analog messages which are included in the cycle.

The message handler function also identifies inbound messages as being associated with one of the selective call devices in the subscriber data base 220 and identifies response messages as being associated with one of the outbound messages in the outbound message memory 208. As one example of cooperation between the home terminal 130 and the system controller 102. The delivery of an outbound message stored in the outbound message memory 208 is completed when: the outbound message has been communicated to the intended selective call device 106; the outbound message is acknowledged by an inbound acknowledgment generated by the selective call device 106 and/or the selective call device has provided the required response including the requested values, e.g., meter reading response, or any other specified response that is need from the selective call device 106 in response to the outbound message. In this example, the message handler function generates another message with the inbound response sent to the home terminal 130 to notify the home terminal 130 that the outbound message has been responded to by the selective call device 106.

System controller 102 is preferably a radio frequency controller (RF-C!) paging terminal manufactured by Motorola, Inc., of Schaumburg Ill. The processing system 204 preferably includes a conventional computer system 212, and conventional mass storage media 214. The conventional computer system 212 preferably comprises a plurality of processors such as VME Sparc processors. These processors include memory such as dynamic random access memory (DRAM), which serves as a temporary memory storage device for scratch pad processing such as, for example, the outbound message memory 208, response received from the selective call devices 106, and for formatting of messages destined for the selective call devices 106. The conventional mass storage media 214 is preferably a conventional hard disk mass storage device. The subscriber data base 220 is preferably stored in the home terminal 130, preferably a wireless messaging gateway (WMG).

It will be appreciated that other types of conventional computer systems 212 can be utilized, and that additional computer systems 212 and mass storage media 214 of the same or alternate type can be added as required to handle the processing requirements of the processing system 204.

The processing system 204 performs functions including the message handler functions described above, which are conventional. The conventional and unique functions are executed by the conventional computer system 212 and controlled by a set of program instructions stored in the mass storage media 214. The unique functions are controlled by a unique set of program codes generated using conventional programming tools.

The radio communication system 100 of the present invention preferably utilizes a synchronous frame structure similar to REFLEX™ (a high speed two-way paging protocol by Motorola, Inc. of Schaumburg, Ill.) on the outbound channel for addressing and digital messaging. The control frames are preferably used for control, addressing, and delivery of digital messages to selective call devices 106. Frames are identical in length to standard FLEX™ frame and both frames begin with the standard FLEX™ synchronization. The frames are time multiplexed on a single forward channel.

Figure 3:
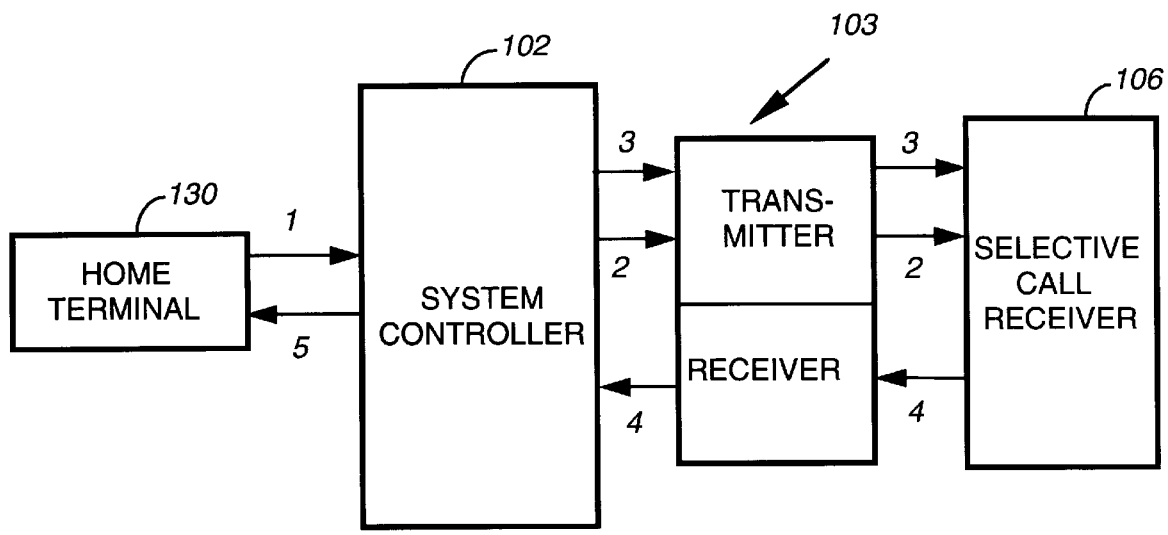
FIG. 3 is a block diagram illustrating the communication flow between the selective call device, the system controller and the home terminal according to FIG. 1.

Referring to FIG. 3, a block diagram is shown illustrating the communication flow between the selective call device, the system controller and the home terminal for an in bound message transmission. Generally, when an outbound message 1 is received at or generated by the home terminal 130 and then passed to the system controller 102. The system controller 102 processes and transmits the outbound message 2 via the transmitter 103 to the special purpose selective call device 106. Upon receipt message 2 by the selective call device 106, the selective call device 106 being a special purpose selective call device 106, proceeds to perform some specified function as required by the receipt of the out bound message. Since the selective call device 106 is a special purpose device 106, it gas to perform some specified function. This specified function is known ahead by the home terminal 130 and the time it takes the selective call device to perform the specified function is also known. Therefore, the home terminal 130 encodes the number of bits that will be required by the selective call device 106 to transmit a response back to the home terminal 130 and an expected time when the selective call device will have completed its task. Once the system controller 102 transmits the outbound message 2 with the number of bits and the expected time it takes the selective call device 106 to complete its task, the system controller 102 begins to allocate a channel on which the selective call device 106 can transmits its response. Once a channel is determined, the system controller 102 determines the number of bits that can be transmitted during particular time slots or period. The information 3 including the channel allocation and the number of bits per time slots are transmitted to the selective call device 106 before it has completed its task or just-in time for it to transmit its response to the system controller 102. When the selective call device 106 completes its special purpose function, it must communicates the values or result to the home terminal 130 via the system controller 102. According to the prior art systems, to send an inbound message, the selective call device would have to request a channel, line 2, from the system controller 102. The system controller 102 then contacts the home terminal 130 to determine if the selective call device is authorized. Upon receiving authorization, the system controller schedules an inbound channel and sends that channel assignment to the selective call device.

However, when the selective call device 106 completes its tack, it would have received the channel assignment and the instruction on the number of bits to be sent during particular time slots until all the information is communicated to the system controller 102. Therefore, once the selective call device 106 has finished its assigned task, it can immediately communicate the values 4, 5 to the home terminal 130 via the system controller 102.

Especially for this special purpose application selective call device, the conventional process of requesting approval and waiting for approval and channel assignment include numerous RF transmissions and undesirable latency. To reduce, the number of RF transmissions and the latency with these special purpose selective call devices, certain parameters which are known by the home terminal and the system controller can be used to reduce the over-the-air (OTA) transmission before an inbound message can be sent by the selective call device.

Generally, the home terminal knows how long it will take the selective call device to perform the function being requested in the outbound message and the expected length of the inbound response. This information is passed to the system controller 102 and when the outbound message is sent, the system controller will know when the selective will be ready after the receipt of the outbound message. During the time the selective call device is reading or collecting the parameters or values requested by the outbound message, the system controller 102 is obtaining an available inbound channel assignment for the expected inbound message from the selective call device. The system controller 102 then communicates the channel assignment including the data "pumping" requirement. The data pumping specifies how many bits to be sent during which time slots, e.g. 15 bits in a first slot, next 20 bits in a second slot, etc. until all the response is communicated to the home terminal 130 via the system controller 102. The system controller 102 can transmit the channel assignment and the pumping requirement to the selective call device 106 before or just in time for it to response when it has acquired the requested information. The selective call device 106 begins transmission 4 according the instruction from the system controller 102. When all the information is received, the information 5 is passed to the home terminal 130.

In this way, with the special purpose application, the selective call device 106 after the receipt of an outbound message, can begin acquiring information to be communicated back to the system controller. However, because the home terminal 130 knows how long it will take the selective call device to acquire the requested information and the number of bits selective call device will require to transmit an inbound message with the requesting information, the system controller can acquire and assign a communication channel ahead of time. The system controller 102 can also instruct the selective call device 106 the number of bits of information to be transmitted during which time slot until the complete information is conveyed. With this method, fewer OTA transmissions are needed and the latency required is reduced because the system controller can assign the channel and the "pump" for data just in time for the transmission of the inbound message by the selective call device 106.

Figure 4:
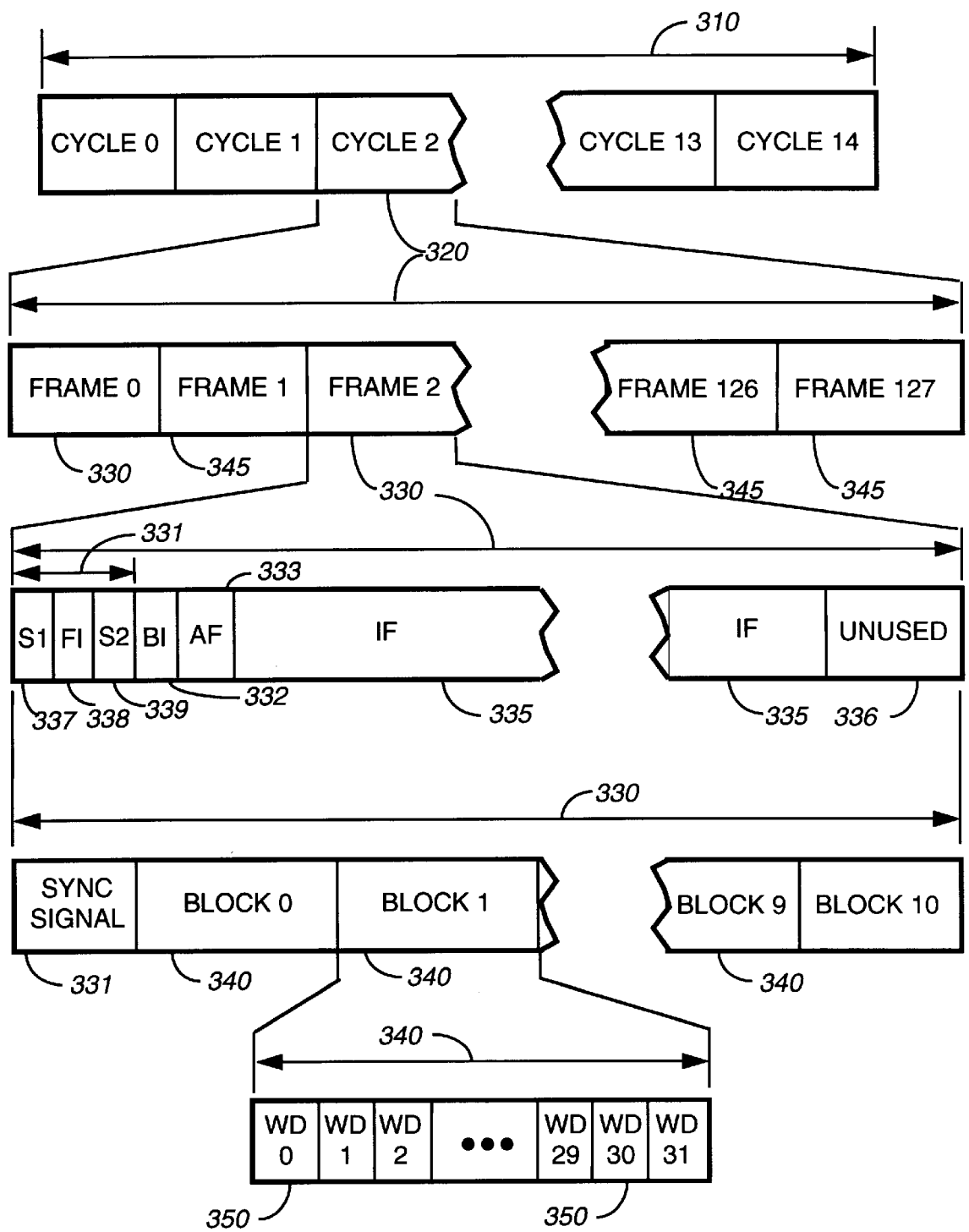
FIG. 4 is a timing diagram illustrating features of the transmission format of an outbound signal in accordance with the preferred embodiment of the present invention.

Referring to FIG. 4 a timing diagram which illustrates features of the transmission format of an outbound signaling protocol utilized by the radio communication system 100 of FIG. 1, and which includes details of a control frame 330 in accordance with the preferred embodiment of the present invention. Control frames 330 are also classified as digital frames 330. The outbound signaling protocol is subdivided into protocol divisions, which are an hour 310, a cycle 320, a frame 330, 345, a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames including control frames 330 and analog frames 345 are transmitted in each of the cycles 320. Normally, all one-hundred-twenty-eight frames are transmitted. One synchronization signal 331 lasting one-hundred-fifteen milliseconds and 11 one-hundred-sixty millisecond uniquely identified blocks 340 are transmitted in each of the control frames 330. The synchronization signal 331 includes a first sync portion 337, a frame information word 338, and a second sync portion 339. The frame information word 338 includes 21 information bits and 11 parity bits. A bit rate of 1600 bits-per-second (BPS), 3200 BPS, or 6400 BPS is usable during the blocks of each control frame 330. The bit rate of the blocks 340 of each control frame 330 is communicated to the selective call devices 106 during the synchronization signal 331. When the bit rate is 1600 BPS, 8 thirty-two bit uniquely identified words 350 are transmitted in each block 340. For bit rates of 3200 BPS or 6400 BPS, 16 uniquely identified words or 32 uniquely identified words, respectively, each having 32 uniquely identified bits, are included in each block 340. In each word, at least 11 bits are used for error detection and correction, and 21 bits or less are used for information, in a manner well known to one of ordinary skill in the art. In some words, 15 bits are used for error detection and correction, and 17 bits are for information, in a manner well known to one of ordinary skill in the art. The bits and words 350 in each block 340 are transmitted in an interleaved fashion using techniques well known to one of ordinary skill in the art to improve the burst error correction capability of the protocol.

Information is included in each control frame 330 in information fields, comprising system information in the frame information word 338 and a block information field (BI) 332, one or more selective call addresses in an address field (AF) 333, one or more of a set of vector packets, short message packets, and long messages in the information field (IF) 335, and an unused field 336 having no useful information therein. One aspect of system information included in the frame information word 338 is the frame number and the cycle number. The cycle number is a number from zero-to-15 which identifies each cycle 320. The frame number is a number from zero-to-one-hundred-twenty-seven which identifies each frame 330 of a cycle 320. The block information field 332 includes information which all active (i.e., not in a battery savings mode) selective call devices 106 decode during the control frame 330. This is called global information. Each vector packet and short message packet in the information field 335 of a frame 330 corresponds to at least one of the addresses in the address field 333 of the same frame 330. Each long message in the information field 335 corresponds to at least one vector packet in the information field 335 of at least one or more frames 330. The boundaries of the fields 332, 333, 335, 336 are defined by the words 350, not by the blocks 340, and the length of the fields 332, 333, 335, 336 are variable, depending on factors such as the type and amount of system information included in the block information field 332, the type of addresses used, and the amount of information in each message. Thus, the length of each of the fields 332, 333, 335, 336 can be shorter or longer than a block 340. The unused field 336 can be zero length when the total of the lengths of the other fields 332, 333, 335 equals eleven blocks 340. All vector packets and short messages intended for a particular selective call device 106 which has been activated for standard service are preferably scheduled for transmission in a predetermined one of the frames 330 of each cycle 320, so as to allow the particular selective call device 106 to go into a low power (non-receive) mode during other frames when short messages and vectors are not included for the particular selective call device 106. The block information field 332 in frame zero includes the following real time information: year, month, day, date, hour, minute, and one-eighth minute.

The vectors contain information which specifies the starting word of a long message in terms of the protocol divisions described above, and additionally, radio channel information such as radio channel frequency, subchannel offset from the radio channel frequency. The starting position and length of a long message, a short message, or a vector packet define the protocol position of the long message, short message, or vector packet.

When a selective call device 106 detects its address within a frame 330, the selective call device 106 processes the associated vector packet or short message packet within the frame 330. When a selective call device 106 decodes a vector packet in a frame 330 which corresponds with its selective call address, the selective call device 106 is directed to receive and decode a long message or an analog message in either the same frame 330, or another control frame 330 or an analog frame 345.

Figure 5:
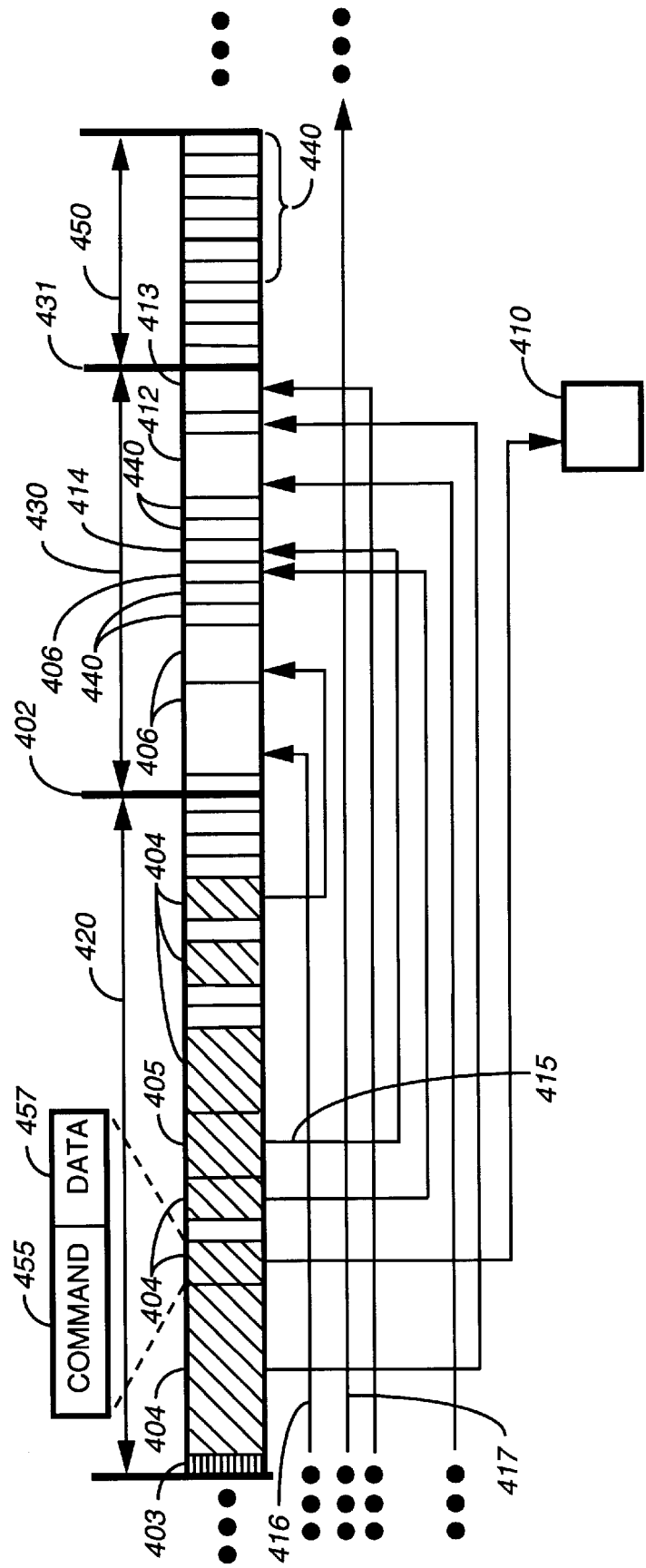
FIG. 5 is a timing diagram of outbound and inbound channels radio signals in accordance with the preferred embodiment of the present invention.

Referring to FIG. 5, a timing diagram shows outbound and inbound channel radio signals for a first type of radio communication system in accordance with the preferred embodiment of the present invention. The outbound channel radio signal is transmitted during an outbound portion 420 of a control frame 330, and the inbound channel radio signals are transmitted during an inbound portion of the control frame 330, and are time division duplexed on the same radio carrier frequency. The outbound channel radio signal is generated and transmitted using the protocol described with reference to FIG. 4. The inbound channel radio signal is generated and transmitted using a conventional digital protocol having a synchronization portion and information words which are error protected. The inbound channel radio signal is transmitted beginning at a time slot 440 boundary. The control frame 330 shown in FIG. 4 is preceded and succeeded by control frames 330 and analog frames 345 (not shown), the order of which is determined by the type of messages generated for transmission from the transmitter/receivers 103. The inbound portion of the control frame 330 comprises a scheduled portion 430 and an ALOHA portion 450. When a selective call device 106 transmits an inbound message, the message is transmitted beginning at one of a predetermined number of periodic time slots 440 defined during each frame 330, 345 of the outbound signaling protocol.

During the outbound portion 420, an outbound channel radio signal is transmitted from the transmitter/receiver 103 to one or more of the selective call devices 106. The synchronization signal 331 (FIG. 4), block information field 332 (FIG. 4), address field 333 (FIG. 4) are shown as a segment 403 (FIG. 5) at the beginning of the outbound portion 420 of the control frame 330. A plurality of outbound messages 404, 405 are transmitted within the outbound portion 420 of the control frame 330. The outbound portion 420 starts at the beginning of the control frame 330 and ends at an outbound/inbound boundary 402. The scheduled portion 430 is at a position in the control frame 330 which starts at the outbound/inbound boundary 402 and ends at a scheduled/ALOHA boundary 431. An outbound/inbound identifier which is transmitted in a block information field 332 of a control frame 330 identifies the position of the outbound/inbound boundary 402 relative to the beginning 401 of the control frame 330 as a number of the time slots 440. The ALOHA portion 450 is at a position in the control frame 330 which starts at the scheduled/ALOHA boundary 431 and ends at the beginning 401 of the next frame 330, 345. A protocol separation identifier which is transmitted in a block information field 332 of a control frame 330 identifies the position of the scheduled/ALOHA boundary 431 relative to the outbound/inbound boundary 402 of the control frame 330 as a number of the time slots 440. A plurality of scheduled responses 406, 410, 412, 413, 414 are transmitted as data units, each data unit extending over one or more time slots 440. For example, scheduled response 410 is four time slots 440, scheduled response 412 is five time slots 440, and scheduled response 413 is two time slots 440. Each of the plurality of scheduled responses 406, 410, 412, 413, 414 is a radio signal transmitted from one of the selective call devices 106 in response to a command 455 which is completed in one of the outbound messages 404, 405. Scheduled response 410 is transmitted by one of the selective call devices 106 simultaneously with portions of scheduled responses 412 and 413, which are transmitted by other selective call devices 106. Scheduled response 410 is an example of a scheduled response which overlaps, in time, other scheduled responses 412, 413. A scheduled response overlap condition will occur, for example, when the system controller 102 schedules different selective call devices 106 to transmit scheduled responses, of which at least some parts are expected to be received at the same time by receivers in different geographically separated transmitter/receivers 103.

The start time of each outbound message 404 is defined as a frame number, block number, and word number. A command 455 is included in one or more of the outbound messages 404, identifying one of the selective call devices 106 by a selective call address of the identified selective call device 106, as well as a scheduled response time at which the identified selective call device 106 transmits a scheduled response in an inbound channel radio signal, the scheduled response comprising a data unit. The command 455 includes a designated length of the data unit. The outbound messages 404 also may include data 457, such as an alphanumeric information message. The start time of each scheduled response 406, 410, 412, 413, 414 is defined relative to the outbound/inbound boundary 402.

Synchronization and timing information required by the selective call devices in the radio communication system 100 for both receiving during the outbound portion of the control frame 330 and transmitting during the inbound portion of the control frame 330 is determined from the segment 403 and the outbound messages 404. When a selective call device 106 receives the outbound radio signal, the selective call device 106 processes the outbound message 404 included in the outbound radio signal when the outbound message 404 includes the selective call address of the selective call device, thus identifying the selective call device 106 for processing the outbound message 404. When a command 455 is received within the outbound message 404, or in a plurality of outbound messages and processed by the selective call device 106, the selective call device 106 then transmits one of the scheduled responses 406, 410, 412, 413, 414 with the designated data unit length and at the scheduled response time commanded by the system controller 102 in the command 455. Correspondence between the commands 455 received by identified selective call devices in the outbound messages 404 and the scheduled responses 406, 410, 412, 413, 414 from the identified selective call devices is indicated in FIG. 4 by arrowed lines from outbound messages 404, 405 to the scheduled responses 406, 410, 412, 413, 414, of which an example is line 415, which connects from a command 455 completed in outbound message 405 to scheduled response 414. Another example is line 416, which connects from a command 455, not shown in FIG. 4, that is completed in an earlier control frame 330 than the control frame 330 shown in FIG. 4, to one of the scheduled responses 406. Another example is line 417 which indicates connection from a command 455, not shown in FIG. 4, that is completed in an earlier outbound control frame than the outbound control frame 330 shown in FIG. 4, to a scheduled response that is in a later control frame 330 than those shown in FIG. 4.

Figure 6:
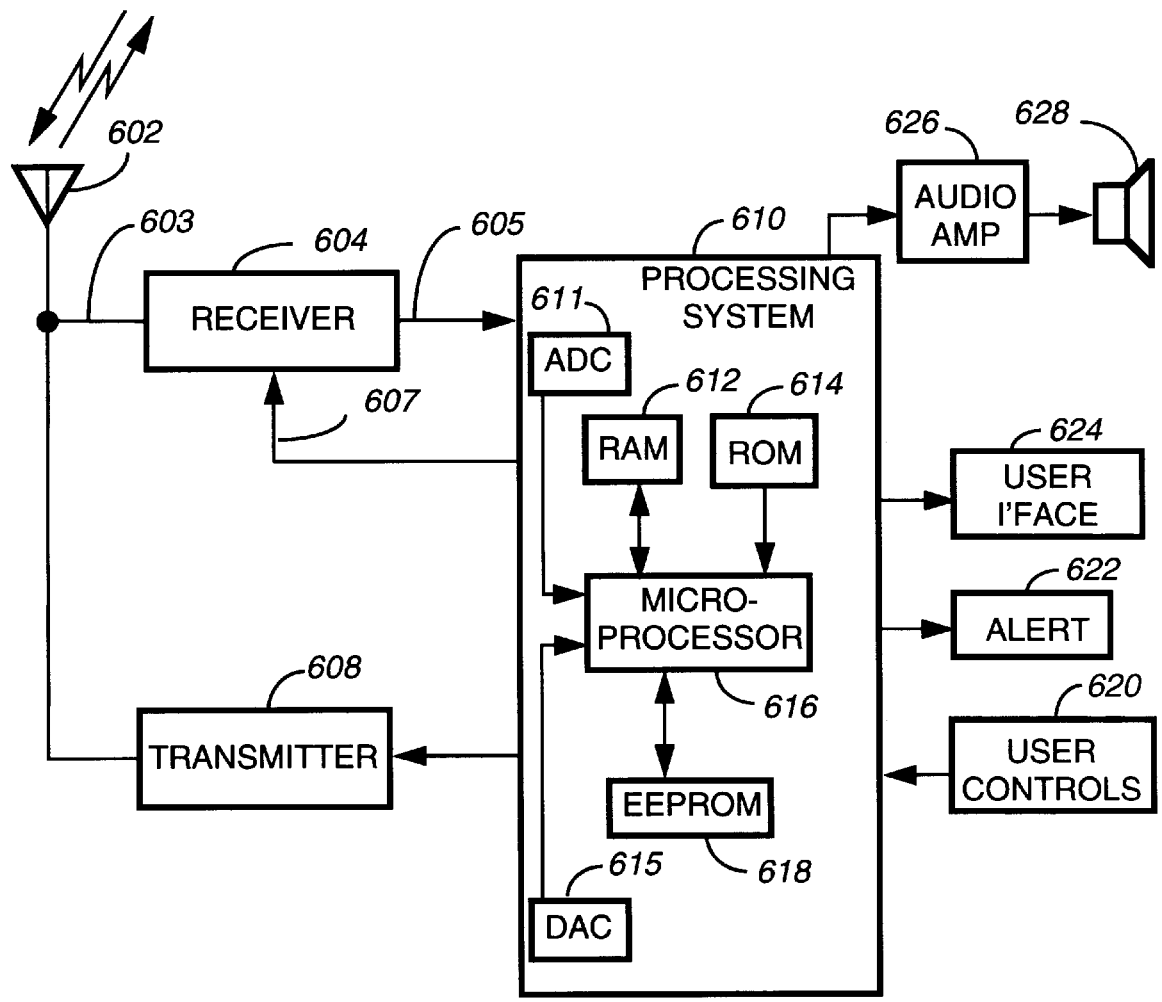
FIG. 6 is an electrical block diagram of the selective call device in accordance with the preferred embodiment of the present invention.

Referring to FIG. 6, an electrical block diagram of a multichannel selective call device 106 is shown in accordance with the preferred embodiment of the present invention. The selective call device 106 includes an antenna 602 for intercepting and transmitting radio signals. The antenna 602 is coupled to a conventional receiver 604 wherein the intercepted signal 603 is received. Receiving includes filtering to remove undesirable energy at off channel frequencies, amplification of the filtered signal, frequency conversion of the signal 603, and demodulation of the signal 603 in a conventional manner. The receiver 604 thereby generates a demodulated signal 605 which is coupled to a processing section 610. The receiver 604 also has a power control input 607 coupled to the processing system 610. The processing system 610 is coupled to a display 624, an alert 622, an audio amplifier 626, a transmitter 608, and a special function device 620. The transmitter 608 is coupled to the processing system 610 by a modulation signal and a channel control signal, and is also coupled to the antenna 602. The audio amplifier 626 is coupled to a speaker 628. The processor section 610 comprises a microprocessor 616 which is coupled to an analog to digital converter (ADC) 611, a digital to analog converter (DAC) 615, a random access memory (RAM) 612, a read only memory (ROM) 614, and an electrically erasable programmable read only memory (EEPROM) 618. The demodulated signal is coupled to the ADC 611. The processing system 610 is coupled to the transmitter by the DAC 615. The ADC 611 converts the demodulated signal from an analog signal to a digital signal in a conventional manner, for processing by the processing system 610. When the demodulation signal is an analog signal, the analog signal is converted to a digital signal using an analog to digital conversion technique such as adaptive differential pulse code modulation (ADPCM). A bit recovery function converts digital signal to binary data in a conventional manner. A synchronization function acquires and maintains bit, word, block, frame, and cycle synchronization with the outbound signaling protocol from the synchronization signal 331 (FIG. 4) of the frames 330, 345 (FIG. 4) in manner well known to one of ordinary skill in the art. A block word decoder function decodes the words 350 (FIG. 4) included in the blocks 340 of the outbound signaling protocol in a manner well known to one of ordinary skill in the art. A message processor function decodes outbound words and processes an outbound message when an address received in the address field 333 (FIG. 4) of the outbound signaling protocol matches an embedded address stored in the EEPROM 618, or when a global indication is received, in a manner well known to one of ordinary skill in the art for a selective call device 106. An outbound message which has been determined to be for the selective call device 106 by the address matching or global indicator is processed by the message processor function according to the contents of the outbound message. An alert signal is typically generated when an outbound messages includes user information. The alert signal is coupled to the alert device 622, which is typically one of an audible and silent alerting device.

When the outbound message includes alphanumeric or graphic information, the information is displayed on the display 624 in a conventional manner by a display function. When the outbound message includes information, e.g., meter reading results, the message handling function converts the meter reading signal to an analog signal which is coupled to the speaker 628 through the audio amplifier 626, which amplifies the signal in a conventional manner. Inbound messages are generated in digital form by a inbound message function, in response to special process or function device 620 for acquiring, reading, or measuring the required information. An inbound message is generated and encoded using the protocol described with reference to FIG. 5 for the reverse (inbound) channel and coupled to the DAC 615, wherein it is converted to an analog signal which modulates the transmitter 608, in a manner well known to one of ordinary skill in the art. The conventional transmitter 608 generates an RF signal, which is transmitted by the antenna 602.

The RAM 612, the EEPROM 618, the ADC 611 and the DAC 615 are preferably conventional parts. The ROM 614 is a conventional part having a unique set of masked program instructions, a portion of which perform the unique functions which are described below. Preferably, the microprocessor 616 is similar to the DSP56100 series digital signal processor (DSP) manufactured by Motorola, Inc. It will be appreciated that other similar processors can be utilized for the microprocessor 616, and that additional processors of the same or alternate type can be added as required to handle the processing requirements of the processing system 610. It will be appreciated that other types of memory, e.g., ultraviolet erasable programmable read only memory (UVEPROM) or flash ROM, can be alternatively utilized for the ROM 614, as well as the RAM 612. It will be further appreciated that the RAM 612, the EEPROM 618, the ADC 611, the DAC 615, and the ROM 614, singly or in combination, can be integrated as a contiguous portion of the microprocessor 616.

The processing system 610 performs functions including at least portions of the bit recovery, synchronization, block word decoding, message processing, display, message handling, and inbound message generation described above. The conventional and unique functions are executed by the microprocessor 616 which is a conventional microprocessor 616 controlled by a set of program codes stored in the mass storage media 214 (FIG. 2). The unique functions are controlled by a unique set of program codes generated using conventional programming tools. The microprocessor 616 is coupled to a special function device 620 according to the preferred embodiment which measures, reads or acquired to information or data which is to be processed by the processing system 610 and transmitted to the home terminal 130.

It will be appreciated that the processing system can be alternatively implemented without the microprocessor 616, by implementing the conventional and unique functions described herein with a combination of conventionally available off the shelf integrated circuits such as CMOS shift registers, clocks, gates, counters, DAC, ADC, and RAM, and that further, some or all of the conventionally available off the shelf integrated circuits used to implement the processing system can be alternatively implemented in an application specific integrated circuit. It will be further appreciated that the microprocessor 616 can alternatively be a conventional microprocessor, such as a microprocessor in the family of 68HC11 microprocessors manufactured by Motorola, Inc., of Schaumburg, Ill.

Figure 7:
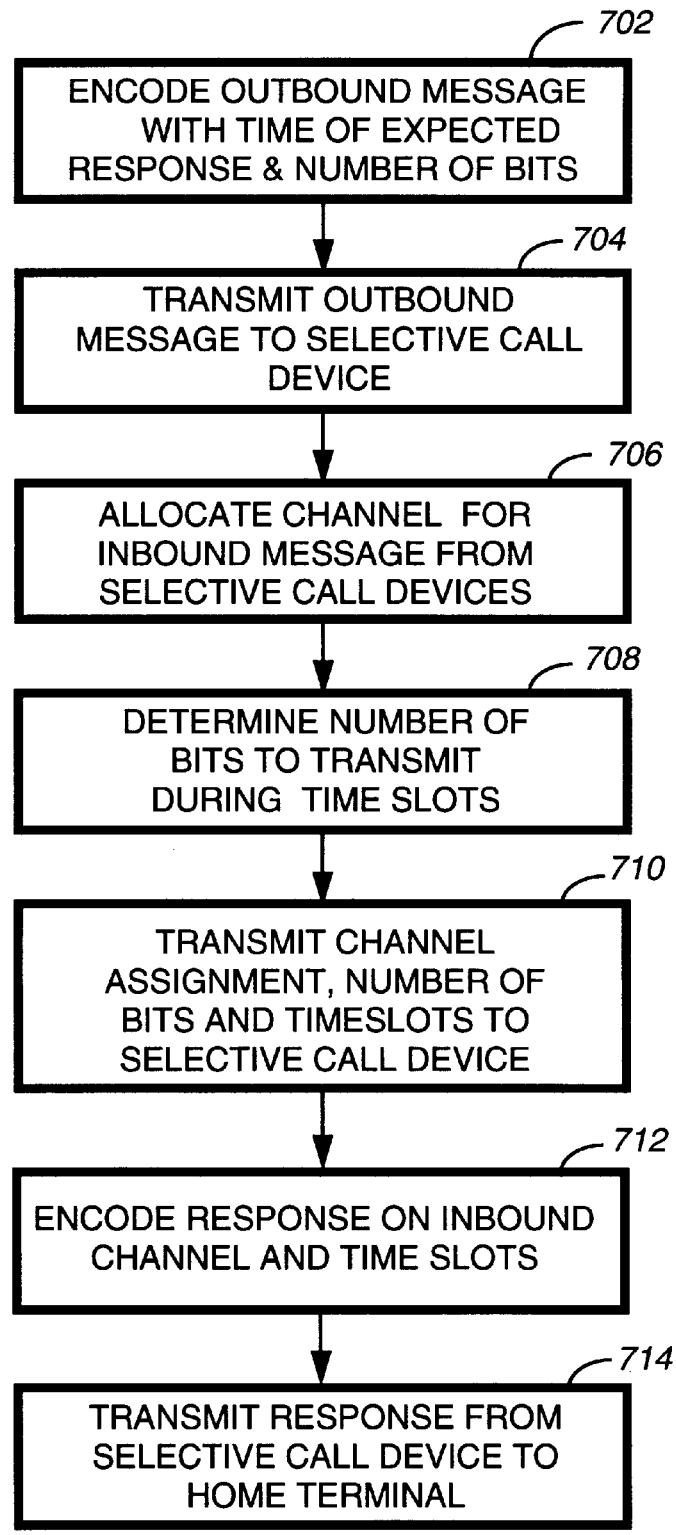
FIG. 7 is a flow diagram of a method for coordinating inbound channel in accordance with the preferred embodiment of the present invention.

Referring to FIG. 7, a flow diagram illustrating a method for coordinating inbound message with an outbound transmission is shown in the selective call communication system of FIG. 1 in accordance with the preferred embodiment of the present invention. When an outbound message is received or generated by the home terminal 130 (FIG. 1), the message generally designates a selective call device 106, preferably a special purpose selective call device 106. The home terminal 130 from the designation in the message identifies the selective call device 106 and retrieves information pertaining to the selective call device 106 from the subscriber data base 220 (FIG. 2). From the subscriber information, the home terminal 130 knows what information is being requested from the selective call device 106, how long it will take the selective call device 106 to measure, read, retrieve or acquire the information, the number of bits that will be needed to transmit an inbound message having the requested information. The home terminal 130 encodes the expected time it will take the selective call device to acquire the information and the number of bits that will be needed to convey the information back to the home terminal 130, step 702. Generally this message is transmitted to the system controller 102 which in turn transmits the outbound message to the selective call device 106, step 704. After the system controller 102 transmits the outbound message to the selective device 106, the system controller 102 uses the expected time it will take for the selective call device 106 to acquire the information to determine when to finish allocating a channel for the selective call device to transmit the inbound response, step 706. The system controller 102 uses the number of bits determined by the home terminal 130 to convey the response from the selective call device 106, the determined the time slots and the number of bits that can be transmitted during each time slot in the inbound response, step 708. The channel assignment or channel allocation including the number of bits and time slots are transmitted to the selective call device 106, preferably, before it completes its special process or just in time for the selective call device 106 to transmit its response to the system controller 102, step 710. It is understood that the system controller 102, sometimes may not complete its channel allocation and bit and time slot identifications before the selective call device is ready to transmit its response. In this case the system controller can instruct the selective call device 106 to wait until it receives the channel assignment, bits, and time slot information instead of requesting a channel assignment. This instruction takes the form of a command to the selective call device 106 to wait for channel assignment can be included in step 704 when the outbound message is transmitted by the system controller 102 to the selective call device 106. The selective call device encodes the response to the home terminal on the allocated channel during the specified time slots, step 712.

Once the selective call device 106 receives the channel assignment and bits and time slot information, it transmits the information in an inbound message which is received by the system controller 102, step 714. The system controller 102 then transmits the response from the selective call device 106 to the home terminal.

In this way, with the special purpose selective call devices 106, the system controller via the home terminal 130, knows ahead of time how long it will take the selective call device 106 to be ready to transmit its response and the number of bits that has to be encoded in the response. With this information, it can schedule the channel and the number of bits on which time slots and transmits the information to the selective call device 106 so that when the selective call device 106 is ready with its response it can begin transmission to the home terminal. This reduces the number of OTA transmissions and the latency that is included on the back and forth transmission from the selective call device 106 to the home terminal 130 until a channel is allocated.

Furthermore, when the communication system is a radio communication system, it need not be a radio communication system which uses a protocol of the FLEX™ family, such as the ReFLEX™ or InFLEXion™ protocol. Other protocols such as the protocol used in the ARDIS™ system could be modified to provide the functions described herein.

We claim:

1. A method for coordinating an inbound channel in a selective call communication system, comprising the steps of:

first encoding an expected time for an inbound response and a number of bits in the inbound response with an outbound message requesting information from a selective call device;

first transmitting the outbound message to the selective call device;

allocating an inbound channel;

determining the number of bits to be encoded in at least one time slot of the inbound channel;

second transmitting an inbound channel assignment and the number of bits to be transmitted in the at least one time slot by the selective call device;

second encoding the information being requested on the inbound channel with the number of bits in each of the at least one time slot; and third transmitting the inbound response on the inbound channel with the number of bits specified for each of the at least one time slot.

2. The method according to claim 1 wherein the first step of encoding further comprises a step of generating the outbound message in a home terminal designating a selective call device capable of acquiring information being requested in the outbound message.

3. The method according to claim 1 wherein the first step of transmitting comprises transmitting the outbound message from a home terminal to a system controller.

4. The method according to claim 3 wherein the first step of transmitting further comprising a third step for encoding the outbound message with a command to instruct the selective call device to wait for a channel allocation.

5. The method according to claim 4 wherein the third step of transmitting from the selective call device further comprises a step of recovering the command to wait for the channel allocation.

6. The method according to claim 5 wherein the third step of transmitting further includes a step of waiting until the channel allocation is received from the system controller before attempting to transmit the information being requested by the home terminal.

7. The method according to claim 1 wherein in the step of determining determines the number of bits that can be transmitted in each of the at least one time slot of the inbound channel.

8. The method according to claim 1 wherein the step of second encoding in the selective call device further includes a step of retrieving the channel allocation, the number of bits to be included in the at least one time slot.

9. A method for coordinating an inbound channel in a selective call communication system, comprising the steps of:

encoding by a home terminal an expected time for an inbound response and a number of bits in the inbound response with an outbound message requesting information from a selective call device, the step of encoding by the home terminal further comprises a step of generating the outbound message in the home terminal designating a selective call device capable of acquiring information being requested in the outbound message;

transmitting by the home terminal the outbound message via a system controller to the selective call device;

allocating by the system controller an inbound channel;

determining by the system controller the number of bits to be encoded in at least one time slot of the inbound channel;

transmitting by the system controller an inbound channel assignment and the number of bits to be transmitted in the at least one time slot by the selective call device, the step of transmitting by the system controller further comprises a step for encoding the outbound message with a command to instruct the selective call device to wait for a channel allocation;

encoding by the selective call device the information being requested on the inbound channel with the number of bits in the at least one time slot; and transmitting by the selective call device the inbound response on the inbound channel with the number of bits specified for each of the at least one time slot, the step of transmitting by the selective call device further comprises a step of recovering the command to wait for a channel allocation.

10. The method according to claim 9 wherein further includes a step of waiting until the channel allocation is received from the system controller before attempting to transmit the information to the home terminal.

11. The method according to claim 9 wherein in the step of determining determines the number of bits that can be transmitted in each of the at least one time slot of the inbound channel until in bound message is received.

12. The method according to claim 9 wherein the step of encoding in the selective call device further includes a step of retrieving the channel allocation, the number of bits to be included in the at least one time slot.

* * * * *

UNITED STATES PATENT AND TRADEMARK OFFICE
CERTIFICATE OF CORRECTION

PATENT NO. : 6,075,794
DATED : June 13, 2000
INVENTOR(S) : Hagai Ohel and Douglas I Ayerst It is certified that error appears in the above-identified patent and that said Letters Patent is hereby corrected as shown below:

<u>Title page,</u>
Item [75], delete "Inventor:" and insert therefor
-- Inventors: --; add the following inventor: -- Douglas I. Ayerst, Delray Beach, Fla. --.

Signed and Sealed this

Sixteenth Day of October, 2001

Attest:

NICHOLAS P. GODICI
Attesting Officer
Acting Director of the United States Patent and Trademark Office